United States Patent
Wong et al.

(10) Patent No.: US 9,451,655 B1
(45) Date of Patent: Sep. 20, 2016

(54) METHODS AND APPARATUS FOR A WIRELESS ACCESS POINT CONVERTER

(71) Applicant: Juniper Networks, Inc., Sunnyvale, CA (US)

(72) Inventors: Gary Wong, San Jose, CA (US); Jeffrey L. Pochop, Jr., Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 302 days.

(21) Appl. No.: 13/630,515

(22) Filed: Sep. 28, 2012

(51) Int. Cl.
*H04W 4/00* (2009.01)
*H04W 88/08* (2009.01)

(52) U.S. Cl.
CPC .................................. *H04W 88/08* (2013.01)

(58) Field of Classification Search
CPC ........................................................ H04W 84/12
USPC ................................ 370/254, 329, 338, 401
See application file for complete search history.

(56) References Cited

U.S. PATENT DOCUMENTS

| | | | |
|---|---|---|---|
| 2003/0115610 A1* | 6/2003 | Cho ..................... H04M 11/062 725/111 |
| 2005/0200456 A1* | 9/2005 | Bridgelall ............. H04W 48/18 340/10.1 |
| 2007/0083668 A1* | 4/2007 | Kelsey ................ H04L 63/1408 709/238 |
| 2007/0171883 A1* | 7/2007 | Beach .................. H04L 12/4625 370/338 |
| 2007/0177561 A1* | 8/2007 | Beach ........................... 370/338 |
| 2008/0008125 A1* | 1/2008 | Pham et al. ................... 370/329 |
| 2008/0117836 A1* | 5/2008 | Savoor et al. ................. 370/254 |
| 2008/0193137 A1* | 8/2008 | Thompson .......... H04L 12/2801 398/115 |
| 2010/0008370 A1* | 1/2010 | Li et al. ......................... 370/401 |
| 2010/0103943 A1* | 4/2010 | Walter .................... H04L 12/10 370/401 |
| 2010/0153751 A1* | 6/2010 | Tseng ................ H04L 12/40045 713/300 |
| 2011/0130163 A1* | 6/2011 | Saban ................. H04W 88/085 455/517 |
| 2011/0164600 A1* | 7/2011 | Smith ........................... 370/338 |
| 2011/0183546 A1* | 7/2011 | Diab ...................... H04L 49/30 439/620.22 |
| 2011/0243151 A1* | 10/2011 | Diab ................... H04L 12/4625 370/463 |
| 2012/0201544 A1* | 8/2012 | Zhang .............. H04B 10/25754 398/115 |

OTHER PUBLICATIONS

Ruckus ZoneFlex 7761-CM, "The first high performance strand-mounted 802.11n Smart Wi-Fi access point with cable modem," Ruckus Wireless, Aug. 15, 2012, Retrieved from the Internet: <URL: http://www.ruckkuswireless.com/products/zoneflex-outdoor/7761-cm> (6 pages).
Power Dsine 9001GO, "Single-port, Outdoor PoE-Midspan, IEEE802.3at Compliant," © 2011 Microsemi Corporation (2 pages).
White Paper: ADSL Technology, "Overview, line qualification and service turn-up," © 2005 JDS Uniphase Corporation (14 pages).

* cited by examiner

*Primary Examiner* — Gregory Sefcheck
*Assistant Examiner* — Jael Ulysse
(74) *Attorney, Agent, or Firm* — Cooley LLP

(57) ABSTRACT

An apparatus includes a first port and a second port operably coupled to a format conversion module each of which is at least partially disposed within a housing. The first port is operably coupled to a cable configured to transfer a first data unit having a first format associated with a first communication medium to the first port. The format conversion module receives the first data unit from the first port and converts the first data unit from the first format to a second format associated with a second communication medium to produce a second data unit. The second port is operably coupled to a wireless access point that is physically distinct from the housing. The second port is configured to receive the second data unit and send the second data unit to the wireless access point.

20 Claims, 3 Drawing Sheets

300

302 Receiving, from a first port operably coupled to a cable having a first communication medium, a data unit in a first format associated with the first communication medium.

304 Receiving, from a second port operably coupled to a cable having a second communication medium different from the first communication medium, a data unit in a second format associated with the second communication medium.

306 Defining, based on the data unit in the first format and at a format conversion module, a first data unit in a third format associated with a third communication medium.

308 Defining, based on the data unit in the second format and at the format conversion module, a second data unit in the third format.

310 Sending the first data unit in the third format to a wireless access point (WAP) such that the WAP transmits the first data unit in the third format.

312 Sending the second data unit in the third format to the WAP such that the WAP transmits the second data unit in the third format.

FIG. 3

METHODS AND APPARATUS FOR A WIRELESS ACCESS POINT CONVERTER

BACKGROUND

Some embodiments described herein relate generally to wireless access points. More specifically, some embodiments described herein relate to converters for use with wireless access points.

More and more networks are established via wireless communication. In some instances, local area networks (LAN) can include a wireless access point configured to connect wireless communication devices with other portions of a wireless local area network (WLAN). In some instances, it can be desirable to use a wireless access point (WAP) in an outdoor environment to extend, for example, a range of a wireless network. The use of WAPs in an outdoor environment, however, can present challenges such as supplying power. For example, some known outdoor wireless access points are plugged into a wall outlet and or have an extension cord run to the wireless access point to provide power. In such instances, the placement of the wireless access point can be limited. In other known instances, the compatibility of an outdoor WAP with existing transmission media included in the rest of the wired network can limit the modes of transmission.

Thus, a need exists for methods and apparatus for providing power and transmission media to, for example, an outdoor wireless access point.

SUMMARY

Apparatus and methods described herein relate to converters for use in conjunction with wireless access points. In some embodiments, an apparatus includes a first port, a second port, and a format conversion module at least partially disposed within a housing. The first port is configured to be operably coupled to a cable having a first communication medium such that the first port can receive, via the cable, a first data unit having a first format associated with the first communication medium. The format conversion module is operably coupled to the first port such that the format conversion module can receive the first data unit from the first port. The format conversion module is configured to convert the first data unit from the first format to a second format associated with a second communication medium to produce a second data unit. The second port is operably coupled to the format conversion module and configured to be operably coupled to a wireless access point that is physically distinct from the housing. The second port is configured to receive the second data unit from the format conversion module and send the second data unit to the wireless access point.

BRIEF DESCRIPTION OF THE DRAWINGS

FIG. 3 is a flowchart illustrating a method for using a conversion device with a wireless access point according to an embodiment.

DETAILED DESCRIPTION

Figure 1:
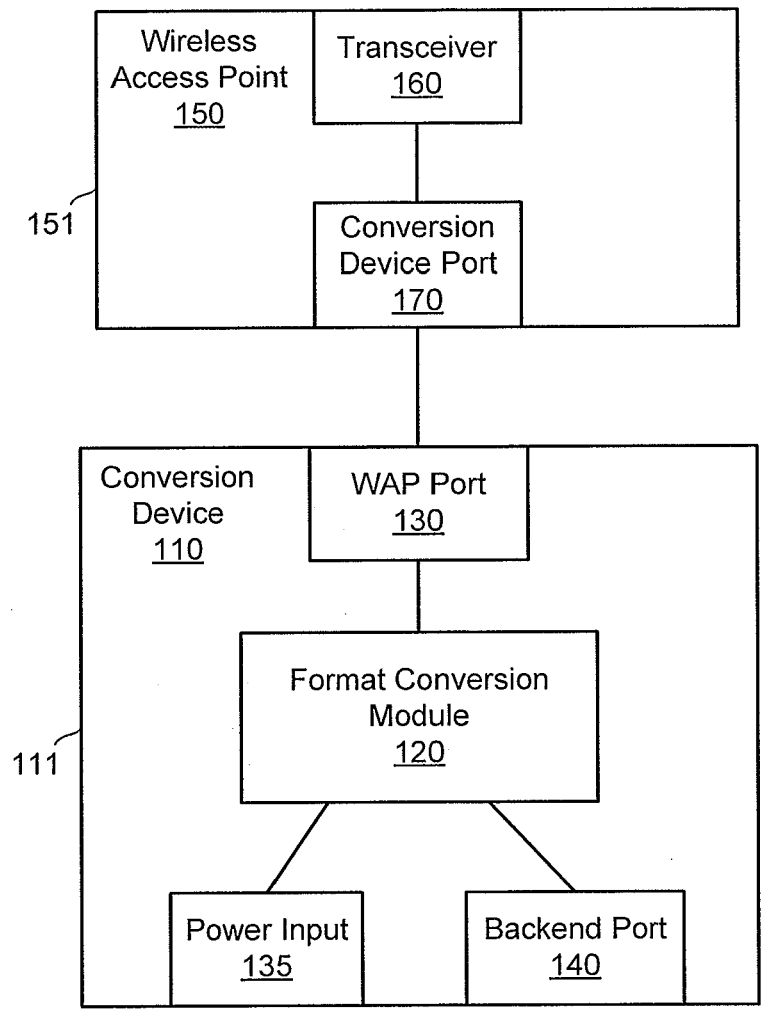
FIG. 1 is a schematic illustration of a conversion device operably coupled to a wireless access point according to an embodiment.

In some embodiments, an apparatus includes a first port, a second port, and a format conversion module at least partially disposed within a housing. The first port is configured to be operably coupled to a cable having a first communication medium such that the first port can receive, via the cable, a first data unit having a first format associated with the first communication medium. The format conversion module is operably coupled to the first port such that the format conversion module can receive the first data unit from the first port. The format conversion module is configured to convert the first data unit from the first format to a second format associated with a second communication medium to produce a second data unit. The second port is operably coupled to the format conversion module and configured to be operably coupled to a wireless access point that is physically distinct from the housing. The second port is configured to receive the second data unit from the format conversion module and send the second data unit to the wireless access point.

In some embodiments, a format conversion module includes a first port and a second port. The first port is configured to be operably coupled to a cable having a first communication medium and the second port is configured to be operably coupled to a cable having a second communication medium. The format conversion module is configured to receive, from the first port, a data unit in a first format associated with the first communication media and is configured to convert the data unit in the first format into a first data unit in a third format. The format conversion module is also configured to receive, from the second port, a data unit in a second format associated with the second communication module and convert the data unit in the second format into a second data unit in the third format. The format conversion module is further configured to send the first data unit in the third format and the second data unit in the third format to a wireless access point.

In some embodiments, a method includes receiving, from a first port operably coupled to a cable having a first communication medium, a data unit in a first format associated with the first communication medium. The method further includes receiving, from a second port operably coupled to a cable having a second communication medium, a data unit in a second format associated with the second communication medium. The method includes a format conversion module defining, based on the data unit in the first format, a first data unit in a third format associated with a third communication medium and defining, based on the data unit in the second format, a second data unit in the third format. The method includes sending the first data unit in the third format and the second data unit in the third format to a wireless access point such that the wireless access point transmits the first data unit in the third format and the second data unit in the third format.

As used in this specification, a "data unit" refers to any suitable portion of data. For example, data unit can refer to a data packet, a data cell, or a data frame such as, information that is delivered as a unit among peer entities of a network and that may contain control information, such as address information, or user data.

As used herein, the singular forms "a," "an" and "the" include plural referents unless the context clearly dictates otherwise. Thus, for example, the term "a module" is intended to mean a single module or a combination of modules.

FIG. 1 is a schematic illustration of an electronic system 100 according to an embodiment. The electronic system 100 includes a conversion device 110 and a wireless access point (WAP) 150. The conversion device 110 includes at least a format conversion module 120, a backend port 140, a WAP port 130, and a power input 135, each of which is at least partially disposed within a housing 111. The housing 111 can be any suitable shape size or configuration. For example, the housing 111 can be an environmentally protected housing. Moreover, the housing 111 can be such that the conversion device 110 is physically distinct from a housing of the WAP 150, as further described herein.

In some embodiments, the conversion device 110 is an electronic device that can include, for example, one or more printed circuit boards (or line cards) and has at least a processor and a memory (not shown in FIG. 1). The one or more printed circuit boards can place the format conversion module 120, the backend port 140, the WAP port 130, and the power input 135 in electrical communication, as further described herein. The power input 135 can be any suitable power input configured to receive a flow of current (e.g., alternating current (AC)) to supply electrical power to the conversion device 110.

The backend port 140 can be any suitable port (e.g., a transceiver) that can be operably coupled to a first cable (not shown in FIG. 1). Similarly stated, the backend port 140 can receive a connection portion of the first cable to at least electronically couple the backend port 140 to the first cable. The first cable can have a first communication medium configured to deliver a first data unit in a first format (e.g., associated with the first communication medium). For example, in some embodiments, the first communication medium can be an optical fiber medium, a coaxial cable medium, a digital subscriber line (DSL) medium, an Ethernet medium, or any other suitable communication medium. In this manner, the first format can include, for example, a header, an encapsulation, a transmission mode, etc. that can be associated with a specific communication medium. For example, in embodiments where the first communication medium is a cable medium, the first data unit in the first format can be a data over cable service interface specification (DOCSIS) frame format.

As described above, the format conversion module 120 is in electronic communication with the backend port 140 such that the format conversion module 120 can receive data units including a first data unit in the first format from the backend port 140. Moreover, the format conversion module 120 can include (or at least be operably coupled to) a processor and a memory (not shown in FIG. 1). For example, in some embodiments, the format conversion module 120 can be a cable modem, a DSL modem, or the like. In this manner, the format conversion module 120 can convert the first data unit in the first format into a second data unit in a second format, as further described herein.

The WAP port 130 can be any suitable port (e.g., a transceiver) that can be operably coupled to a second cable (not shown in FIG. 1). For example, the WAP port 130 can receive a connection port of the second cable to at least electronically couple the WAP port 130 to the second cable. The WAP port 130 is also operably coupled to the format conversion module 120 (as described above) and the wireless access point 150 (e.g., via the second cable). In this manner, the WAP port 130 and the second cable can collectively place the wireless access point 150 in electrical communication with the format conversion module 120, as further described herein.

The WAP port 130 can be configured to receive data units including the second data unit in the second format from the format conversion module 120. Expanding further, the second cable can have a second communication medium that corresponds to the second format such that the WAP port 130 can transmit the second data unit in the second format to the second cable. For example, in some embodiments, the second communication medium can be an Ethernet medium. In some embodiments, the second communication medium can include power over Ethernet (PoE), as further described herein. In this manner, the format of the second data unit (i.e., the second format) can be an Ethernet frame, such as Ethernet II.

The wireless access point (WAP) 150 includes a housing 151, a transceiver 160 and a conversion device port 170 configured to operably couple the WAP 150 to the conversion device 110, as described in further detail herein. The housing 151 is configured to enclose (i.e., house) at least a portion of the transceiver 160 and the conversion device port 170. The housing 151 can be any suitable shape, size, or configuration and is configured to be physically distinct from the housing 111 of the conversion device 110. Similarly stated, the WAP 150 is physically independent of the conversion device 110. In some embodiments, the physical separation of the WAP 150 from the conversion device 110 can be such that the form factor (i.e., the housing 151) of the WAP 150 can be maintained within a desired size. For example, in some embodiments, a relatively small form factor associated with the WAP 150 can facilitate installation of the WAP 150 (e.g., can make mounting the WAP 150 easier than a WAP of larger size). In some embodiments, the physical separation of the WAP 150 from the conversion device 110 can substantially reduce a level of electromagnetic interference that would otherwise be experienced by the WAP 150.

In some embodiments, the WAP 150 is an electronic device that can include, for example, one or more printed circuit boards and has at least a processor and a memory (not shown in FIG. 1). The one or more printed circuit boards can place the transceiver 160 in electrical communication with the conversion device port 170. The conversion device port 170 can be any suitable port (e.g., a transceiver port) that can be operably coupled to the second cable. In this manner, the conversion device port 170 of the WAP 150 is in electrical communication with the WAP port 130 of the conversion device 110 and can receive the second data unit in the second format, as further described herein. In some embodiments, the conversion device port 170 can also include and/or be operably coupled to a power module disposed within the housing 151 of the WAP 150 (not shown in FIG. 1). In such embodiments, the second cable can be configured to transmit an electrical current (e.g., DC power) to WAP 150. For example, in some embodiments, the second communication medium of the second cable can include power over Ethernet (PoE) such that the WAP 150 need not be plugged into, for example, an AC receptacle. In other embodiments, the conversion device port 170 need not include (or need not be operably coupled to) a power module.

The transceiver 160 can be any suitable device configured to transmit and/or receive a radio signal (e.g., Wi-Fi, Bluetooth, or other wireless communication standard) to connect a wireless client device to a wired network (e.g., a wired network that can include at least the WAP 150, the conversion device 110, and other electronic devices connected thereto). A wireless client device can be, for example, any device that can receive data packets (e.g., data units) from and/or send data packets to the WAP 150 through a wireless connection, such as, for example, a mobile phone, a Wi-Fi enabled laptop, a personal computer (PC), a tablet, a Bluetooth enabled device, etc.

The conversion device port 170 of the WAP 150 can receive the second data unit in the second format from the WAP port 130 of the conversion device 110 (via the second cable) and transmit the second data unit in the second format to the transceiver 160. In this manner, the transceiver 160 can broadcast the second data unit to any suitable wireless client device that is in range of the radio signal (e.g., Wi-Fi, Bluetooth, etc.). In some embodiments, the wireless client device can be configured to transmit data units such as a third data unit to the WAP 150 such that the WAP port 130 of the conversion device 110 can receive the third data unit in the second format. In such embodiments, the format conversion module 120 can receive the third data unit in the second format from the WAP port 130 and convert the third data unit from the second format to the first format to produce a fourth data unit in the first format. In this manner, the backend port 140 can receive the fourth data unit in the first format and transmit the fourth data unit to the first cable (not shown in FIG. 1).

Figure 2:
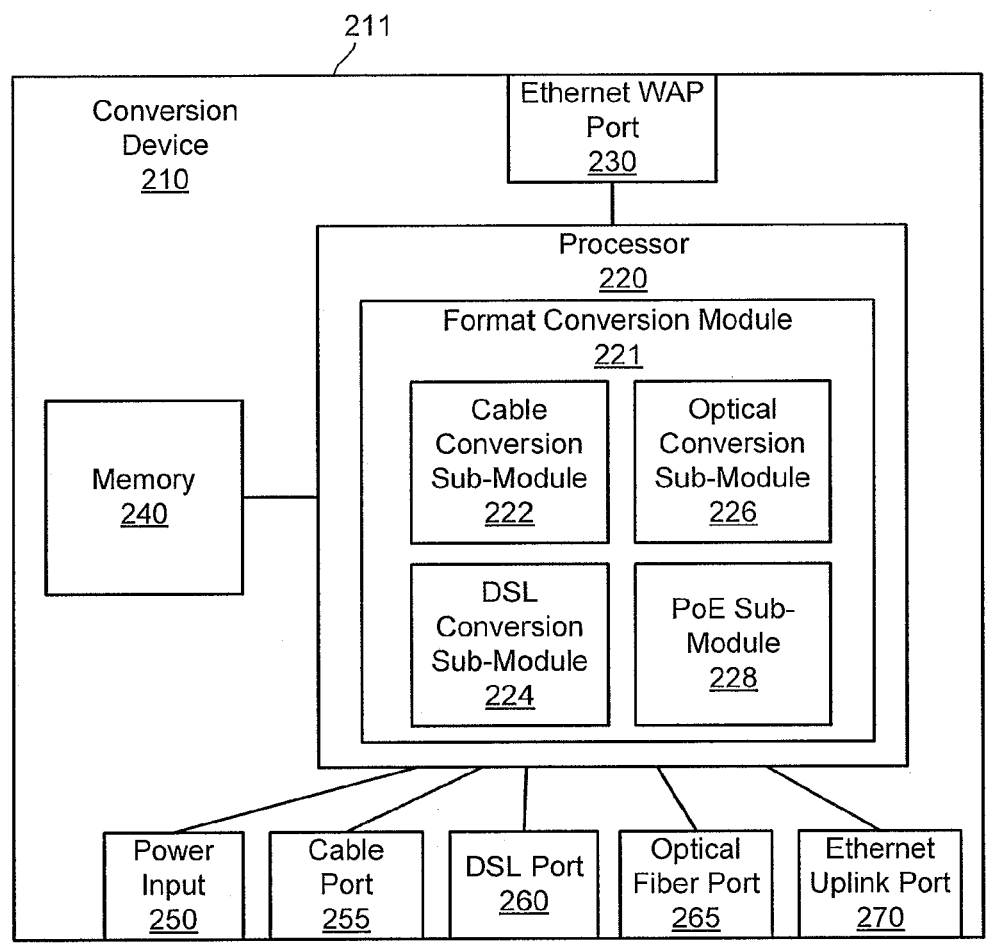
FIG. 2 is a schematic illustration of a conversion device according to an embodiment.

FIG. 2 is a schematic illustration of a conversion device 210 according to an embodiment. The conversion device 210 includes a processor 220, a memory 240, an Ethernet WAP port 230, a power input 250, a cable port 255, a digital subscriber line (DSL) port 260, an optical fiber port 265, and an Ethernet backend port 270 each of which is at least partially disposed within a housing 211 of the conversion device 210. More specifically, the conversion device 210 is an electronic device that can include, for example, one or more printed circuit boards (or line cards) that can place the processor 220, the memory 240, the Ethernet WAP port 230, the power input 250, the cable port 255, the DSL port 260, the optical fiber port 265, and the Ethernet backend port 270 in electrical communication, as further described herein. The power input 250 can be any suitable power input configured to receive a flow of current (e.g., alternating current (AC)) to supply electrical power to the conversion device 210.

While the conversion device 210 is described above as including the cable port 255, the digital subscriber line (DSL) port 260, the optical fiber port 265, and the Ethernet backend port 270, in other embodiments, any of the ports can be optional. For example, in some embodiments, a conversion device includes a cable port. In some embodiments, a conversion device can include a cable port and a DSL port. In other embodiments, a conversion device can include a cable port, a DSL port, and an optical fiber port. In still embodiments, a conversion device can include any arrangement of the ports described above.

The cable port 255 can be any suitable port (e.g., a transceiver port) that can be operably coupled to a first cable (not shown in FIG. 2). More specifically, the cable port 255 can be physically and electrically coupled to, for example, a coaxial (coax) cable. Similarly stated, the cable port 255 can receive a connection portion (e.g., typically a male coax connector) of the coax cable to at least electronically couple the cable port 255 to the coax cable. The coax cable can be configured to send and receive data units including a data unit in a first format that is associated with the coax cable communication medium. For example, in some embodiments, the coax cable can be configured to send and receive data units to and from, respectively, the cable port 255 that can include a data unit in a DOCSIS frame format (e.g., the first format).

The DSL port 260 can be any suitable port (e.g., a transceiver port) that can be operably coupled to a second cable (not shown in FIG. 2). More specifically, the DSL port 260 can be physically and electrically coupled to a DSL cable. Similarly stated, the DSL port 260 can receive a connection portion (e.g., RJ-45, universal serial bus (USB), firewire, or the like) of the DSL cable to at least electronically couple the DSL port 260 to the DSL cable. The DSL cable can be configured to send and receive data units including a data unit in a second format associated with the DSL cable communication medium. For example, in some embodiments, the DSL cable can be configured to send and receive data units to and from, respectively, the DSL port 260 that can include a data unit in an asynchronous transfer mode (ATM) cell format (e.g., the second format).

The optical fiber port 265 can be any suitable port (e.g., an optical transceiver port) that can be operably coupled to a third cable (not shown in FIG. 2). More specifically, the optical fiber port 265 can be physically and electrically coupled to an optical fiber cable. Similarly stated, the optical fiber port 265 can receive a connection portion (e.g., Lucent Connector (LC), Mechanical Transfer (MT), Subscriber Connector (SC), or the like) of the optic fiber cable to at least electronically couple the optical fiber port 265 to the optical fiber cable. The optical fiber cable can be configured to send and receive data units including a data unit in a third format associated with the optical fiber cable communication medium. For example, in some embodiments, the optical fiber cable can be configured to send and receive data units to and from, respectively, the optical fiber port 265 that can include a data unit in, for example, a pulse code modulation format (e.g., the third format).

The Ethernet backend port 270 can be any suitable port (e.g., a transceiver port) that can be operably coupled to a fourth cable (not shown in FIG. 2). More specifically, the Ethernet backend port 270 can be physically and electrically coupled to an Ethernet cable. Similarly stated, the Ethernet backend port 270 can receive a connection portion (e.g., RJ-45 or the like) of the Ethernet cable to at least electronically couple the Ethernet backend port 270 to the Ethernet cable. The Ethernet cable can be configured to send and receive data units including a data unit in a fourth format associated with the Ethernet cable communication medium. For example, in some embodiments, the Ethernet cable can be configured to send and receive data units to and from, respectively, the Ethernet backend port 270 that can include a data unit in an Ethernet frame format (e.g., the fourth format).

The Ethernet WAP port 230 can be any suitable port (e.g., a transceiver port) that can be operably coupled to a fifth cable (not shown in FIG. 2). More specifically, the Ethernet WAP port 230 can be physically and electrically coupled to an Ethernet cable. Similarly stated, the Ethernet WAP port 230 can receive a connection portion (e.g., RJ-45 or the like) of the Ethernet cable to at least electronically couple the Ethernet WAP port 230 to the Ethernet cable. Moreover, a second end of the Ethernet cable (not shown in FIG. 2) can be operably coupled to a WAP (not shown in FIG. 2). In this manner, the WAP (such as described in reference to FIG. 1) can be in electrical communication with the conversion device 210 while being physically isolated from the conversion device 210, as further described herein.

The Ethernet WAP port 230 can receive data units including a data unit in a fifth format (e.g., associated with the Ethernet cable communication medium) from the format conversion module 221, as further described herein. In some embodiments, the fifth format can be substantially similar to the fourth format associated with the Ethernet backend port 270 (e.g., the Ethernet frame format). In some embodiments, the fifth format can be associated with an Ethernet cable communication medium configured to provide power over Ethernet (PoE), as further described herein.

The memory 240 included in the conversion device 210 can be, for example, a random access memory (RAM), a memory buffer, a hard drive, a read-only memory (ROM), an erasable programmable read-only memory (EPROM), and/or so forth. In some embodiments, the memory 240 includes a set of instructions to cause the processor 220 to execute modules, processes and/or functions used to convert a format of a data unit, as further described herein.

The processor 220 can be any suitable processor such as, for example, a general purpose processor, a central processing unit (CPU), a network processor, a front end processor, and/or the like. As such, the processor 220 is configured to perform a set of instructions stored in the memory 240. For example, the processor 220 can receive a data unit in a first format and convert the data unit to a second format. The processor 220 can be configured to execute specific modules and/or sub-modules that can be, for example, hardware modules, software modules stored in the memory 240 and executed in the processor 220, and/or any combination thereof.

As shown in FIG. 2, the processor 220 includes a format conversion module 221 that includes a cable conversion sub-module 222, a DSL conversion sub-module 224, an optical fiber conversion sub-module 226, and a power over Ethernet (PoE) sub-module 228, The format conversion module 221 can receive a signal associated with a data unit in a given format (e.g., the first, second, third, or fourth format described above) and convert the data unit to a desired format (e.g., the fifth format) such that the data unit can be delivered to the Ethernet WAP port 230 in the desired format. For example, in some embodiments, the format conversion module 221 can be at least a portion of a modem configured to receive a data unit in a given format (described above) and convert the data unit to a desired format (e.g., the fifth format).

In some embodiments, the format conversion module 221 can receive a signal of a data unit in a format associated with the cable port 255, the DSL port 260, the optical fiber port 265, and/or the Ethernet backend port 270. In such embodiments, the format conversion module 221 can route the data unit in the given format to a sub-module associated with the given format. For example, in some embodiments, the format conversion module 221 can receive a signal associated with a data unit in the first format (e.g., a DOCSIS frame format or the like) from the cable port 255 and route the signal to the cable conversion sub-module 222. In this manner, the cable conversion sub-module 222 can execute a set of instructions (e.g., stored in the memory 240) to convert the data unit from the first format to the fifth format. For example, in some embodiments, the converting can include changing one or more of a header, an encapsulation, a transmission mode, a frequency, or other suitable data unit characteristic. In this manner, the cable conversion sub-module 222 can convert the data unit from the first format associated with the coax cable communication medium to the fifth format associated with the PoE communication medium.

In some embodiments, the format conversion module 221 can receive a signal associated with a data unit in the second format (e.g., an ATM cell format or the like) from the DSL port 260 and route the signal to the DSL conversion sub-module 224. In this manner, the DSL conversion sub-module 224 can execute a set of instructions to convert the data unit from the second format to the fifth format. More specifically, the DSL conversion sub-module 224 can convert the data unit from the second format associated with the DSL cable communication medium to the fifth format associated with the PoE communication medium.

In some embodiments, the format conversion module 221 can receive a signal associated with a data unit in the third format (e.g., a pulse-code modulation (PCM) format such as non-return-to-zero or return-to-zero) from the optical fiber port 265 and route the signal to the optical fiber conversion sub-module 226. In this manner, the optical fiber conversion sub-module 226 can execute a set of instructions to convert the data unit from the third format (e.g., associated with the optical fiber cable communication medium) to the fifth format (e.g., associated with the PoE communication medium).

While not shown in FIG. 2, in some embodiments, the format conversion module 221 can include an Ethernet conversion sub-module that can receive a signal from the Ethernet port 270. In such embodiments, the Ethernet conversion sub-module can convert a data unit from the fourth format associated with an Ethernet cable communication medium that is not compatible with PoE to the fifth format associated with the Ethernet cable communication medium that is compatible with PoE. In other embodiments, conversion is not needed for the data unit in the fourth format (e.g., the fourth format is compatible with PoE).

The power over Ethernet sub-module 228 is configured to send an electric current (e.g., DC power) to the Ethernet WAP module 230 such that the Ethernet cable coupled thereto can transfer the electric current to the WAP (described above). Expanding further, the power over Ethernet sub-module 228 can convert a portion of the AC electrical power supplied to the conversion device 210 (e.g., via an electrical outlet and power cord) to DC electrical power that can be sent to the Ethernet WAP port 230. In this manner, the conversion device 210 and more specifically, the PoE sub-module 228 can provide a sufficient amount of electrical current (e.g., DC power) to continuously power the WAP. More specifically, the PoE sub-module 228 can provide a flow of DC electrical power to the Ethernet WAP port 230 such that the DC electrical power can be delivered to the WAP via the PoE capable Ethernet cable. In some embodiments, the PoE sub-module 228 and/or the WAP can include a "wake" function such that the PoE sub-module 228 supplies power when needed and does not supply power when not needed.

While not shown in FIG. 2, in some embodiments, the format conversion module 221 can include any other module configured to limit or direct bandwidth usage. For example, in some embodiments, the format conversion module 221 can include a module configured to execute a set of instructions (e.g., stored in the memory 240) that can allocate a portion of an available bandwidth to a specific port. In such embodiments, the format conversion module 221 can allocate the available bandwidth based on a flow control or fairness algorithm. In some embodiments, the format conversion module 221 can be configured to receive an indicator associated with a data unit that can dictate or indicate a priority level of the data unit. For example, in some embodiments, a data unit can include an indicator associated with a high level of priority. In this manner, the format conversion module 221 can receive the data unit and can convert the data unit (e.g., from the first, second, third, or fourth format, to the fifth format) before a data unit including an indicator associated with a lower priority level.

In some embodiments, the format conversion module 221 can allocate the available bandwidth based on a set of user preferences. In some embodiments, the format conversion module 221 can be configured to execute a set of instructions associated with buffering data units according to an available bandwidth of the Ethernet WAP port 230. For example, in some embodiments, buffering can include storing data units in the memory 240 until Ethernet WAP has sufficient bandwidth.

In use, the format conversion module 221 can receive a signal associated with a data unit in any of the first format, the second format, the third format, and/or the fourth format. The format conversion module 221 can be configured to route the signal to the corresponding conversion sub-module (e.g., the cable conversion sub-module 222, the DSL conversion sub-module 224, or the optical fiber sub-module 226, respectively) such that the data unit can be converted (e.g., by changing one or more of a header, an encapsulation, a transmission mode, a frequency, or other suitable data unit characteristic) to the fifth format and delivered to the Ethernet WAP port 230. In this manner, the Ethernet WAP port 230 can send a signal associated with the data unit in the fifth format to the WAP (not shown in FIG. 2) via the PoE compatible Ethernet cable. Thus, the WAP can receive a supply of DC electrical power (e.g., via the PoE sub-module 228) and the signal associated with the data unit in the fifth format. The WAP can be configured to transmit, for example, a radio signal associated with the data unit in the fifth format to a wireless client device (as described above with reference to the WAP 150 shown in FIG. 1).

The arrangement of the WAP and the conversion device 210 is such that the WAP can be connected to a wired network that can include any suitable communication medium without the WAP having multiple ports associated with the communication medium. Similarly stated, the arrangement of the WAP and the conversion device 210 can be such that the WAP can have only an Ethernet port and can connect to a wired network using different communication mediums via the conversion device 210. In this manner, a legacy WAP can be used in conjunction with a wired network that can include communication mediums other than, for example, Ethernet. Moreover, by having a single port (e.g., the conversion device port 170 shown in FIG. 1) the form factor of the WAP can maintain a desired size and existing functionality.

In some embodiments, the WAP can send a signal associated with a second data unit in the fifth format to the Ethernet WAP port 230. In such embodiments, the Ethernet WAP port 230 can send a signal associated with the second data unit in the fifth format to the format conversion module 221 such that the cable conversion module 222, the DSL conversion module 224, or the optical fiber conversion module 226 can convert the second data unit in the fifth format to the first, second, or third format, respectively. Expanding further, the second data unit can include an indicator (e.g., instructions, a header, or the like) configured to dictate or indicate the format into which the second data unit is to be converted.

Thus, the second data unit can be sent to the cable port 255, the DSL port 260, or the optical fiber port 265 according to the converted format of the second data unit (e.g., the first format, second format, or third format, respectively). In some embodiments, the format conversion module 221 can be configured to deliver the data unit in the fifth format to the Ethernet backend port 270. In other embodiments, the format conversion module 221 can include the Ethernet conversion module (described above) that can receive the signal associated with the second data unit in the fifth format and can convert the second data unit in the fifth format to the fourth format. In such embodiments, the format conversion module 221 can send a signal associated with the second data unit in the fourth format to the Ethernet backend port 270.

In some embodiments, the conversion device 210 can be configured to execute a set of instructions based on a user preference. For example, in some embodiments, a user can monitor and/or reconfigure the conversion device 210 according to a desired preference associated with, for example, allocating bandwidth. In some embodiments, the conversion device 210 can include any suitable input device such that the user can input a set of user preferences. In other embodiments, the user can use a wired network device or a wireless network device (e.g., a personal computer, a laptop, a tablet, a smartphone, or the like) to input a set of user preferences. In such embodiments, the wired or wireless network device can include a personal computer application, a tablet application, a smartphone application, or the like. In other embodiments, the user can monitor and/or reconfigure the conversion device 210 while not connected to the network (e.g., via the internet).

FIG. 3 is a flowchart illustrating a method 300 for using a conversion device in conjunction with a wireless access point, according to an embodiment. The method 300 includes receiving a data unit in a first format from a first port included in the conversion device, at 302. For example, in some embodiments, a format conversion module (e.g., the format conversion module 120 of FIG. 1) can receive the data unit in the first format from the first port. The first port can be operably coupled to a cable having a first communication medium such that the first format is associated the first communication medium.

At 304, a data unit in a second format, different from the first format, is received from a second port. In some embodiments, the format conversion module can receive the data unit in the second format. In other embodiments, any suitable sub-module can receive the data unit in the second format (e.g., the cable conversion sub-module 222, the DSL conversion module 224, or the optical fiber conversion module 226 described above with reference to FIG. 2). The second port can be operably coupled to a cable having a second communication medium such that the second format is associated with the second communication medium.

At 306, a first data unit in a third format associated with a third communication module is defined based on the data unit in the first format. For example, the format conversion module can convert the data unit in the first format to the first data unit in the third format. Similarly, the format conversion module can define, based on the data unit in the second format, a second data unit in the third format, at 308.

At 310, the first data unit in the third format is sent to a wireless access point (WAP) such that the WAP transmits the first data unit in the third format. For example, in some embodiments, the format conversion module can send a signal to an Ethernet WAP port (e.g., as described above in reference to FIG. 2). The Ethernet WAP port can be operably coupled to an Ethernet cable (e.g., the third communication medium) such that the Ethernet cable sends the first data unit in the third format to the WAP. In some embodiments, the Ethernet WAP port and the Ethernet cable (i.e., the third communication medium) can be compatible with power over Ethernet (PoE) such that the Ethernet cable can deliver electrical power to the WAP. The WAP can be, for example, similar to the WAP 150 described above in reference to FIG. 1. Similarly, at 312, the second data unit in the third format is sent to the WAP such that the WAP transmits the second data unit in the third format, at 312.

While the method 300 describes a first port associated with a first format and a second port associated with a second format, the conversion device can include any number of ports associated with any number of respective formats. For example, in some embodiments, the conversion device can include three ports, four ports, or more.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, while the method 300 (FIG. 3) describes a sequential process of defining the first data unit in the third format and the second data unit in the third format, in other embodiments, the defining of the first data unit in the third format and the defining of the second data unit in the third format can be performed in parallel.

Where schematics and/or embodiments described above indicate certain components arranged in certain orientations or positions, the arrangement of components may be modified. Similarly, where methods and/or events described above indicate certain events and/or procedures occurring in certain order, the ordering of certain events and/or procedures may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

The invention claimed is:

1. An apparatus, comprising:
a first port having at least a portion disposed within a housing, the first port configured to be operably coupled to a cable having a first communication medium, the first port configured to receive via the cable a first data unit having a first communication format associated with the first communication medium;
a processor including a format conversion module having at least a portion disposed within the housing, the format conversion module operably coupled to the first port, the format conversion module including a plurality of conversion sub-modules, each conversion sub-module from the plurality of conversion sub-modules configured to convert data of a communication format that is different from a communication format of each remaining sub-modules from the plurality of conversion sub-modules, the format conversion module configured to receive the first data unit from the first port, the format conversion module configured to convert the first data unit from the first communication format to a second communication format associated with a second communication medium, using a conversion sub-module from the plurality of conversion sub-modules that is associated with the first communication format, to produce a second data unit, the first communication format being a communication format incompatible with Power-over-Ethernet (PoE), and the second format being a PoE-compatible format; and
a second port having at least a portion disposed within the housing, the second port operably coupled to the format conversion module, the second port configured to be operably coupled to a wireless access point (WAP) physically distinct from the housing, the second port configured to receive the second data unit from the format conversion module and send the second data unit to the WAP.

2. The apparatus of claim 1, further comprising:
a third port having at least a portion disposed within the housing, the third port configured to be operably coupled to a cable having a third communication medium different from the first communication medium and the second communication medium, the third port configured to receive via the cable having the third communication medium a third data unit having a third communication format associated with the third communication medium,
the format conversion module operably coupled to the third port, the format conversion module configured to receive the third data unit from the third port, the format conversion module configured to convert the third data unit to the second communication format to produce a fourth data unit, the second port configured to receive the fourth data unit from the format conversion module and send the fourth data unit to the WAP.

3. The apparatus of claim 1, wherein the first communication medium is one of an optical fiber medium, a coaxial cable medium, or a digital subscriber line (DSL) medium, the second communication medium is an Ethernet medium.

4. The apparatus of claim 1, wherein the second port is configured to be operably coupled to the WAP via a cable associated with the second communication medium.

5. The apparatus of claim 1, wherein the second port is configured to provide power to the WAP.

6. The apparatus of claim 1, wherein the first communication medium is a coaxial cable medium and the format conversion module includes a cable modem.

7. The apparatus of claim 1, wherein the second port is configured to receive, from the WAP, a third data unit, the third data unit having the communication second format, the format conversion module configured to receive the third data unit from the second port, the format conversion module configured to covert the third data unit from the second communication format to the first communication format to produce a fourth data unit, the format conversion module configured to send the fourth data unit to the first port.

8. An apparatus, comprising:
a processor including a format conversion module including a plurality of conversion sub-modules each conversion sub-module from the plurality of conversion sub-modules configured to convert data of a communication format that is different from a communication format of each of the remaining sub-modules from the plurality of conversion sub-modules, the format conversion module configured to be operably coupled to a cable having a first communication medium via a first port, the format conversion module configured to be operably coupled to a cable having a second communication medium via a second port,
the format conversion module configured to receive, from the first port, a data unit in a first communication format incompatible with Power-over-Ethernet (PoE) and associated with the first communication medium, the format conversion module configured to convert the data unit in the first communication format to a first data unit in a PoE-compatible format using a conversion sub-module from the plurality of conversion sub-modules that is associated with the first communication format, the format conversion module configured to receive, from the second port, a data unit in a second format incompatible with PoE and associated with the second communication medium, the format conversion module configured to convert the data unit in the second communication format to a second data unit in the PoE-compatible format,
the format conversion module configured to send the first data unit in the PoE-compatible format and the second data unit in the PoE-compatible format to a wireless access point (WAP) disposed within a second housing physically distinct from the first housing via a connection having a third communication medium.

9. The apparatus of claim 8, wherein the first communication medium is one of an optical fiber medium, a coaxial cable medium, or a digital subscriber line (DSL) medium,
the second communication medium is one of an optical fiber medium, a coaxial cable medium, or a digital subscriber line (DSL) medium,
the third communication medium is an Ethernet medium.

10. The apparatus of claim 8, wherein, the format conversion module is configured to send the first data unit in the PoE-compatible format and the second data unit in the PoE-compatible format to the WAP via a third port.

11. The apparatus of claim 8, wherein the format conversion module is disposed within a housing including at least a portion of the first port and at least a portion of the second port.

12. The apparatus of claim 8, wherein the first communication medium is a coaxial cable medium and the format conversion module includes a cable modem.

13. The apparatus of claim 8, wherein the format conversion module is configured to send the first data unit in the PoE-compatible format to the WAP via a third port configured to provide power in a PoE format to the WAP.

14. The apparatus of claim 8, wherein the data unit in the first communication format is a first data unit in the first communication format,
the format conversion module configured to receive, from the WAP, a third data unit in the PoE-compatible format, the format conversion module configured to convert the third data unit in the PoE-compatible format to a second data unit in the first communication format based on an indicator in the third data unit in the PoE-compatible format, the format conversion module configured to send the second data unit in the first communication format to the first port.

15. A method, comprising:
receiving, from a first port operably coupled to a cable having a first communication medium, a data unit in a first communication format incompatible with Power-over-Ethernet (PoE) and associated with the first communication medium;
receiving, from a second port operably coupled to a cable having a second communication medium different from the first communication medium, a data unit in a second communication format incompatible with POE associated with the second communication medium;
defining, based on the data unit in the first communication format and at a format conversion module of a processor, a first data unit in a PoE-compatible format associated with a third communication medium, the format conversion module including a plurality of conversion sub-modules, each conversion sub-module from the plurality of conversion sub-modules configured to convert data of a communication format that is different from a communication format of each of the remaining sub-modules from the plurality of conversion sub-modules;
defining, based on the data unit in the second communication format and at a conversion sub-module from the plurality of conversion sub-modules of the format conversion module that is associated with the first communication format, a second data unit in the PoE-compatible format;
sending the first data unit in the PoE-compatible format to a wireless access point (WAP) disposed in a second housing physically distinct from the first housing, such that the WAP transmits the first data unit in the PoE-compatible format; and
sending the second data unit in the PoE-compatible format to the WAP such that the WAP transmits the second data unit in the PoE-compatible format.

16. The method of claim 15, wherein the sending the first data unit in the PoE-compatible format includes sending the first data unit in the PoE-compatible format to the WAP via a third port, the third port being associated with the PoE-compatible format.

17. The method of claim 15, wherein the first communication medium is one of an optical fiber medium, a coaxial cable medium, or a digital subscriber line (DSL) medium, the second communication medium is one of an optical fiber medium, a coaxial cable medium, or a digital subscriber line (DSL) medium, the third communication medium is an Ethernet medium.

18. The method of claim 15, wherein at least a portion of the first port is disposed within a housing, at least a portion of the second port is disposed within the housing, the format conversion module is disposed within the housing.

19. The method of claim 15, wherein the first communication medium is a coaxial cable medium and the format conversion module includes a cable modem.

20. The method of claim 15, wherein the sending the first data unit includes sending the first data unit to the WAP via a Power over Ethernet (PoE) port.

* * * * *